INVENTORS
George R. Dempster
Harry W. Jones
BY
Cameron, Kerkam + Sutton
ATTORNEYS

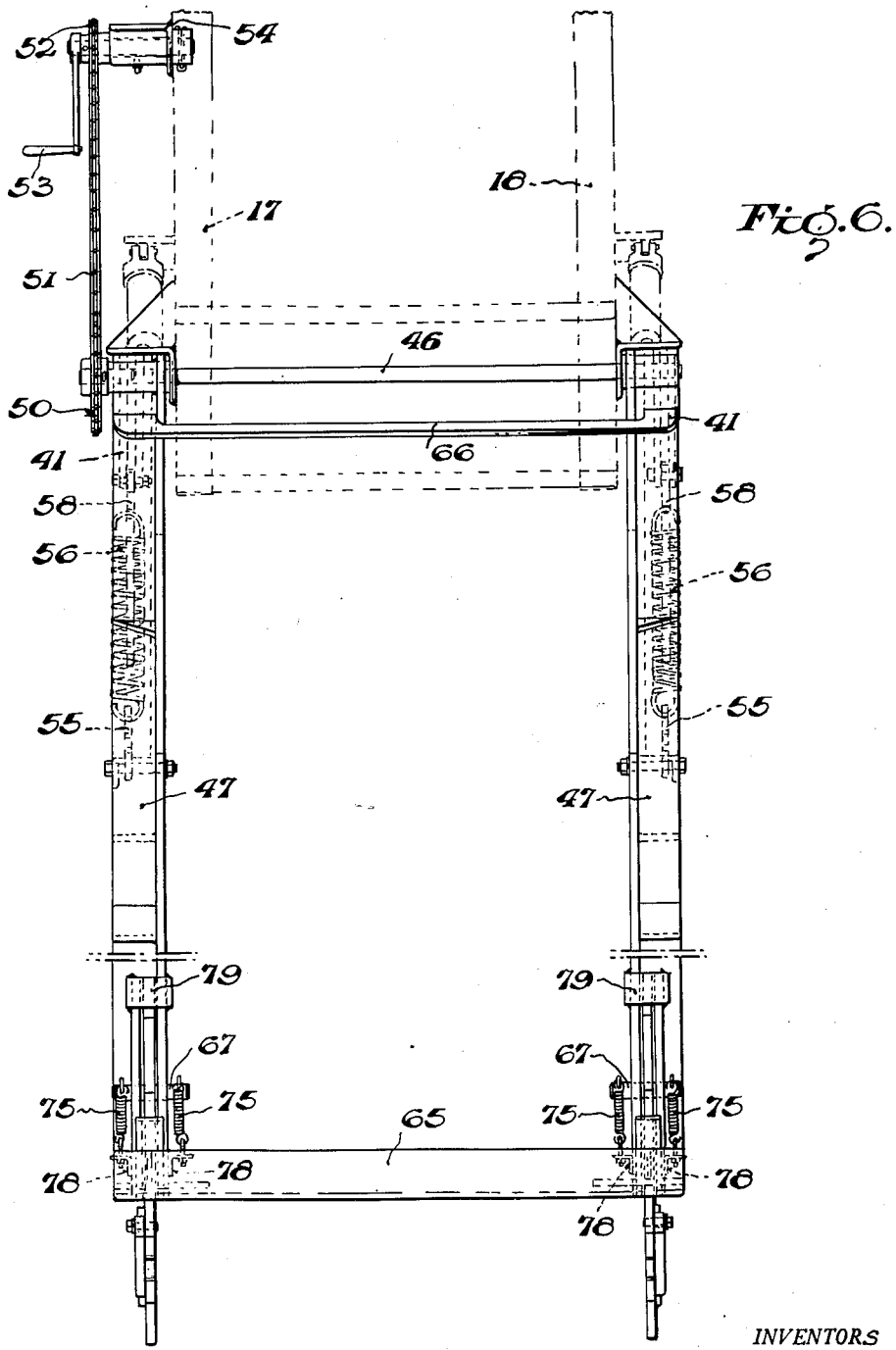

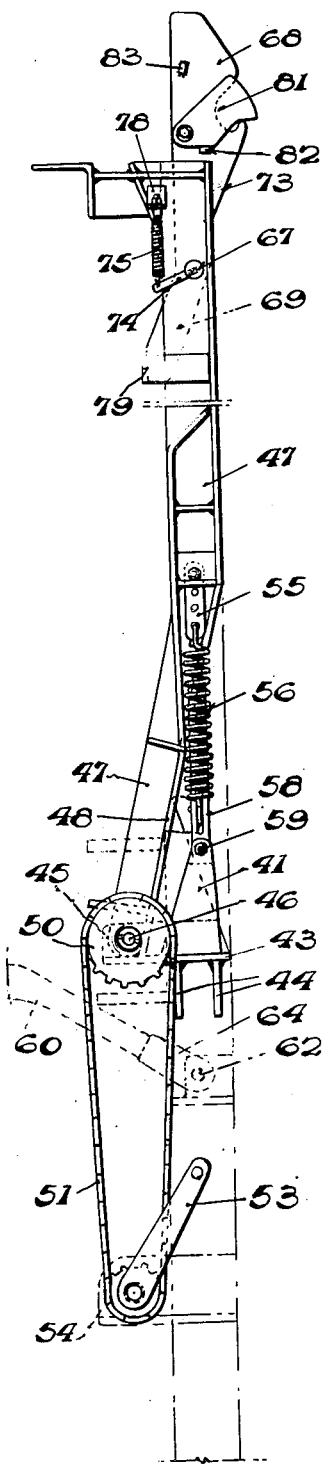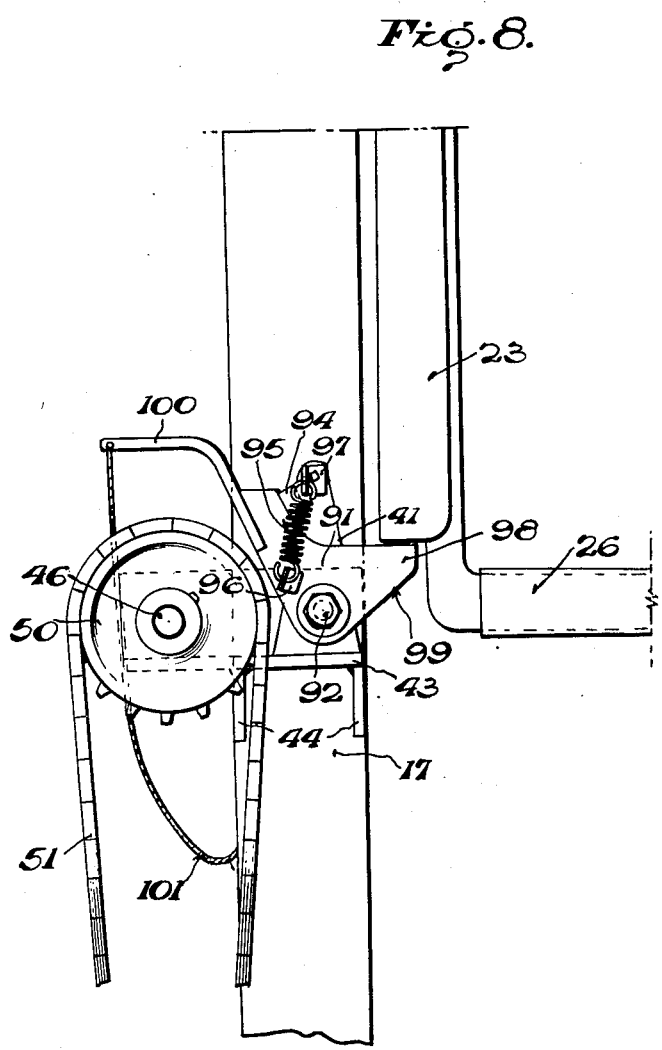

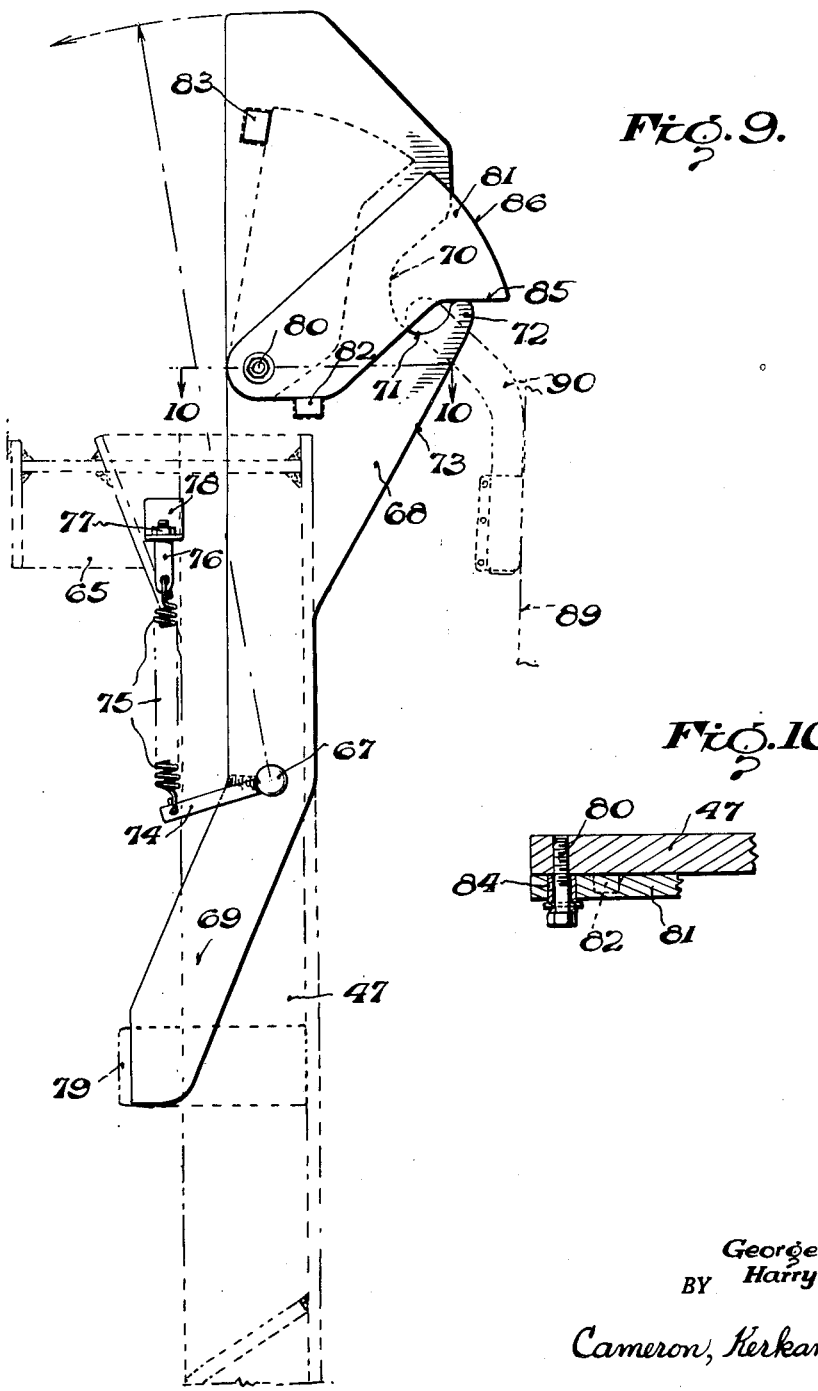

Patented May 26, 1953

2,639,829

UNITED STATES PATENT OFFICE 2,639,829

FORK TRUCK HAVING PIVOTALLY MOUNTED EXTENSION FOR HIGH LEVEL DUMPING

George R. Dempster and Harry W. Jones, Knoxville, Tenn., assignors to Dempster Brothers Incorporated, Knoxville, Tenn., a corporation of Tennessee Application June 13, 1949, Serial No. 98,844

15 Claims. (Cl. 214—317)

This invention relates to material-handling devices, and more particularly to devices of the type commonly called "fork trucks" wherein a truck driven by any suitable motor is provided with upstanding ways on which a carriage, provided with a fork for engaging and transporting any suitable load, may be moved upwardly and downwardly.

It has heretofore been proposed to provide a fork truck with an extension for said ways so that, when it is desirable to transport a load on the fork to an elevation above the ways proper, the carriage for the fork as it is moved upwardly on the ways engages said extension and lifts it to a higher elevation, in which position the extension may be locked to receive the fork carriage for high level dumping. This lifting of the extension by the carriage imposes on the carriage the double burden of lifting the load on the fork and lifting the load of the extension, or else the carriage without a load has to be run upwardly in order to extend the ways and then be moved downwardly to receive the load to be transported. Devices of this character are also open to the objection that the structure is undesirably bulky and heavy, and complicated and expensive to fabricate, because of the necessity for providing the ways with means for telescopically receiving and guiding the extension of the ways.

It is an object of this invention to provide an improved fork truck having a pivotally mounted extension which may be moved into and out of operative position without movement of the carriage.

Another object of this invention is to provide an improved device of the type characterized wherein the ways are provided with a pivotally mounted extension which may be readily lowered to an approximately horizontal position, so that the truck may readily pass through conventional doors and comparable openings, or be quickly moved to an upright position so that dumping provisions on the extension may be raised into position for high level operation.

Another object of this invention is to provide an improved device of the type last characterized wherein the means for moving the pivotally mounted extension into and out of operative position may be operated with a minimum of effort and at relatively high speed.

Another object of this invention is to provide an improved device of the type as so far characterized with improved automatic hooks carried by the pivotally mounted extension so that a dumping container can be lifted by the fork into automatic engagement with the hooks and the carriage for the fork may thereafter be operated to effect high level dumping of the contents of the container.

Another object of this invention is to provide a device of the type last characterized with automatic means for preventing movement of the carriage, when effecting dumping, to an extent that would interfere with the carriage thereafter picking up the container and lowering it to the floor or ground.

Another object of this invention is to provide an improved device of the type characterized wherein the pivotally mounted extension is of relatively light construction, yet strong and durable, which is composed of parts that are easy and inexpensive to fabricate and assemble, and which is provided with operating means that facilitate easy and rapid movement of the extension into its operative and inoperative positions.

Other objects of the invention will appear as the description of the invention proceeds.

Stated broadly, the invention comprises a fork truck of the type which is provided with upstanding ways on which a power-actuated slide is mounted, said slide being so connected to a carriage provided with the fork and slidable relative to both said slide and said ways that said carriage may be raised and lowered by said slide at double the speed of said slide, said truck being provided with an extension pivotally mounted on said ways adjacent the upper extremities thereof for movement between an approximately horizontal position, in which the extension and parts associated therewith do not project substantially if at all above the top of the ways proper, so as to avoid interference with the truck moving through openings such as conventional doors, and an upwardly projecting position in which the extension provides an upwardly projecting support for dumping provisions extending to any suitable height, said extension being also provided with counterbalancing means so that the weight of the extension in approximately horizontal position may be largely counterbalanced to the end that lifting of the extension to operative position may be effected with a minimum of effort and at relatively high speed, said extension being provided with automatic hook means so that a suitable container carried by the fork may be automatically engaged therewith and suspended therefrom for automatic dumping at the provided high level.

The invention is capable of receiving a variety of mechanical expressions only one of which has been illustrated on the accompanying drawings, and it is therefore to be expressly understood that the drawings are for purposes of illustration only, and are not to be construed as a definition of the limits of the invention, reference being had to the appended claims for that purpose.

Referring in detail to the accompanying drawings, wherein the same reference characters are employed to designate corresponding parts in the several figures, Fig. 1 is a perspective elevation of a fork truck embodying the present invention with the pivotally mounted extension on the ways shown in its approximately horizontal position;

Fig. 6 is a rear plan view of the extension and the operating means therefor;

Fig. 7 is a side view of the structure shown in Fig. 6;

Fig. 8 is a view to an enlarged scale of the device for automatically preventing the lowering of the carriage to an extent that will interfere with its picking up the dumping container after the container has been dumped;

Fig. 9 is a view to an enlarged scale to illustrate a preferred form of automatic hook for use with the present invention; and Fig. 10 is a cross section on the line 10—10 of Fig. 9.

Figure 1:
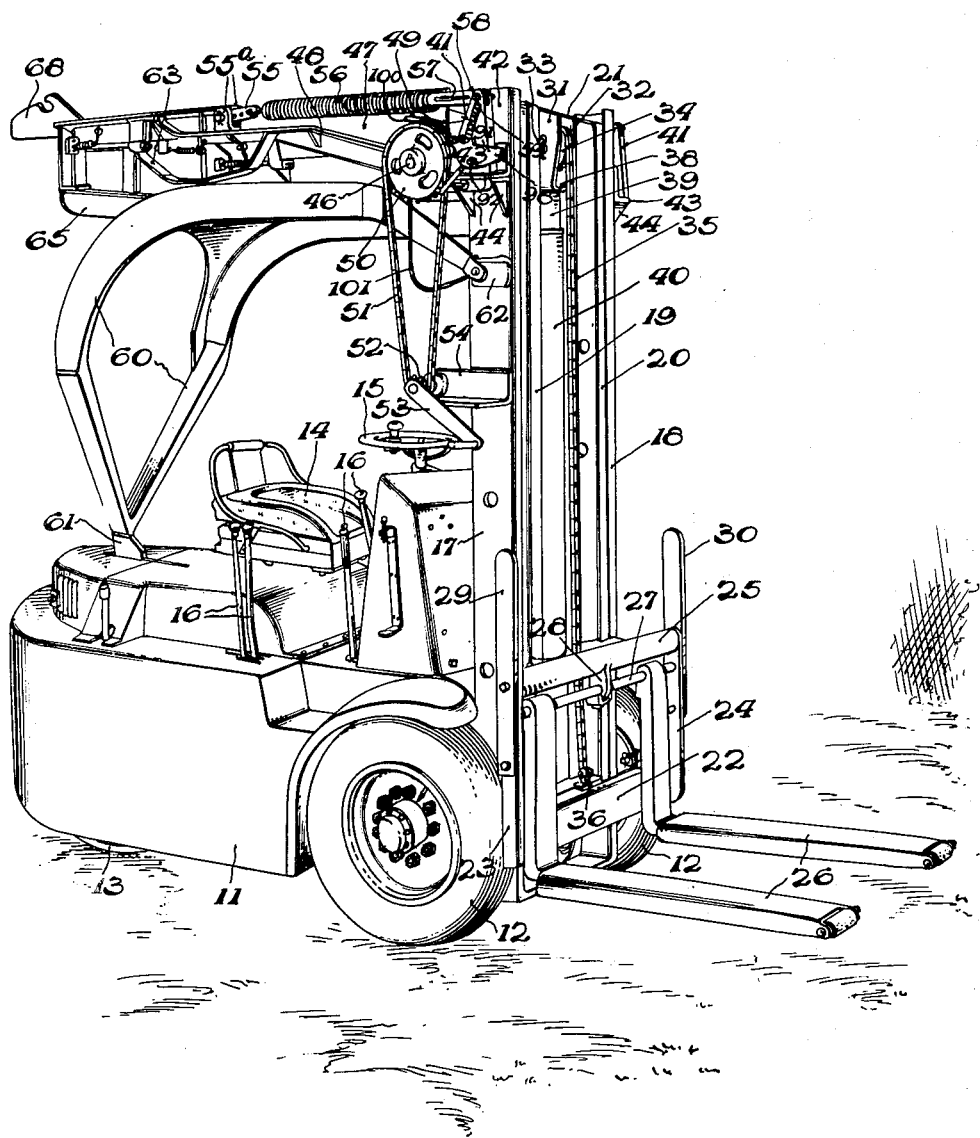

In the form shown, 11 designates any suitable truck driven by any suitable motor and provided with front wheels 12 and a centrally disposed rear wheel 13 although, if preferred, a truck using a pair of rear wheels may be employed. Truck 11 is provided with a suitable seat 14 for the operator, a steering wheel 15 and suitable control means 16 for operating the truck and the mechanism carried thereby in a manner well understood in the art. As the details of the truck proper constitute no part of the present invention further description thereof is deemed to be unnecessary.

Rigidly secured to the front of the truck in any suitable way are a pair of upstanding ways 17 and 18, preferably of channel formation with their channels facing inwardly. As shown, said ways extend vertically but inclined ways could be used if preferred. Said ways extend to any convenient height, but are preferably of such a height as not to interfere with the fork truck passing through conventional doorways and comparable openings. Slidably mounted in the channel-shaped ways 17, 18 is a slide comprising a pair of lateral members 19 and 20, which also may be of channel shape formation and of a size to slide in the channels of the ways 17 and 18, or said lateral members 19 and 20 may be provided with suitable blocks, runners or comparable members for sliding in the channels of the ways 17 and 18. If desired, any suitable antifriction means may be interposed between the lateral members 19 and 20 and the ways 17 and 18. At their upper extremities lateral members 19 and 20 are cross connected into a unit by a suitable plate or the like 21.

Mounted to slide relative to the slide 19, 20 and the ways 17 and 18 is a carriage for the fork comprising a transversely extending plate 22 which projects laterally to both sides of the ways 17 and 18 and has upwardly extending side members 23 and 24 connected by a rigid bar or rod 25. Mounted on said carriage in any suitable way is a fork 26 of any suitable construction, here shown as carried by a transversely extending rod 27 supported in said side members 23 and 24 and by an ear 28 depending from the rod 25. Projecting upwardly from the side members 23 and 24 are extension pieces 29 and 30 for engagement with the rear wall of a container or other load carried by the forks 26, as will appear more fully hereinafter.

Extending downwardly from the upper transverse plate 21, and integral therewith or suitably attached thereto, are a pair of plates 31 and 32 in which is journaled a stub shaft 33 that carries a pinion 34 in the space between the plates 31 and 32. In mesh with said pinion 34 is a chain 35 which at its forward extremity is secured in any suitable way at 36 to the transversely extending plate 22 of the fork carriage. The opposite or rear extremity of chain 35 is secured to any suitable fixed member 37, which may be attached to the rear of the ways 17 and 18, preferably adjacent the upper extremity thereof. Plates 31 and 32 are connected by a transverse member 38, which may be integral with said plates or suitably attached thereto, and the carrier for pinion 34 composed of members 21, 31, 32 and 38, which is connected through plate 21 to the slide 19, 20, is connected in any suitable way to a slide operating means of any suitable construction, here shown as a piston rod 39 of a hydraulic device 40 which is mounted on the truck between the ways 17 and 18 in any suitable way, the cylinder being for example mounted on a tie plate 40a which connects the lower ends of the ways 17, 18.

When hydraulic fluid is admitted to the lower end of the device 40, by manipulation of a suitable control on the truck associated with the controls 16, piston rod 39 is elevated, carrying therewith the carrier for pinion 34 and the slide 19, 20. As the chain 35 meshing with said pinion 34 is fixed at its rear end 37, upward movement of the pinion 34 and slide 19, 20 by the piston rod 39 causes the chain 35 to lift the fork carriage at a rate of movement which is twice that of the pinion 34 and slide 19, 20, whereby the fork 26 may be lifted to an elevated position above the upper extremity of the ways 17 and 18 by a movement of the piston rod 39 which is one half the extent of movement of the fork 26 and its carriage.

Mounted on the outer face of each of the ways 17 and 18 is an upstanding plate 41 which is spaced from the corresponding way so as to leave an intermediate slot 42 for a reason to be explained. As shown, each plate 41 is carried by an angle extension piece 43, which may be integral with or suitably attached to the plate 41 and the associated way 17 or 18 and which may be suitably reinforced as by brackets 44. Said angle extension pieces 43 project to the rear of the plates 41, as shown more particularly at 45 in Fig. 7, and rotatably mounted in vertical flanges of said extension pieces 45 is a transverse shaft 46. Secured to said shaft 46 in any suitable way are a pair of arms 47 connected to provide a pivotally mounted frame carried by the ways 17 and 18. Said arms may be of any suitable rigid construction, being shown as provided with reinforcing ribs 48, and preferably have their forward faces so disposed that when said arms are rotated on said shaft 46 as a pivot into side-by-side alignment with the ways 17 and 18 said forward faces lie in approximately the same plane with the forward faces of the ways 17 and 18. In this position the end edges 49 of the arms 47 engage the angle extension pieces 63 at the bottoms of the slots 42, and if desired any suitable means may be provided for locking said arms in this position, although this ordinarily is unnecessary in view of the provisions next to be described.

Also secured to the shaft 46 in any suitable way is a pinion 50 with which meshes a chain 51 extending around a smaller pinion 52 mounted on the hub of a crank 53 that is rotatably supported in a bracket 54 secured in any suitable way to the outer face of the way 17. Crank 53 is so positioned as to be conveniently accessible to the operator in the seat 14, so that by rotating the crank 53 with its associated pinion 52, the chain 51 is driven to rotate the pinion 50 and thereby to rotate the shaft 46 with the extension arms 47 secured thereto. Thereby the frame comprising the arms 47 may be moved rapidly by a pivotal movement from the approximately horizontal position shown in Fig. 1 through the intermediate position shown in Fig. 2 to the upright position shown in Fig. 3.

To counterbalance the extension arms 47, each arm is provided with a spring connector 55 which is pivotally mounted in lugs 55a and is provided with a plurality of holes so that the spring may be adjustably tensioned. Extending from each spring connector 55 is a coil spring 56 having its opposite end bent and slidably mounted in the slot 57 of a second spring connector 58 pivotally mounted at 59 at the upper extremity of the corresponding plate 41. When the extension arms 47 are moved to the approximately horizontal position shown in Fig. 1, owing to the eccentric relationship of the pivot 59 with respect to the shaft 46, each spring 56 is drawn to the extremity of its slot 57 and tensioned so that when the arms reach the approximately horizontal position shown in Fig. 1 the tension of said springs 56 is such as to counterbalance the weight of the arms 47 to the extent desired. As said springs 56 tend to pull the extension arms 47 around their pivotal axis 46 to their upright position, by suitably predetermining the tension of the springs 56 when said arms are in approximately horizontal position a predeterminately small force applied to the crank 53 is all that is required to move the arms 47 from their approximately horizontal to their upright positions.

In order to support the arms 47 in their approximately horizontal position as well as to predetermine the extent to which said arms may be moved downwardly, the truck is preferably provided with a frame or hood 60 suitably attached thereto at 61 and having forwardly extending arms secured at 62 in any suitable way to the outer faces of the ways 17 and 18. Each extension arm 47 is shown as provided with a loop-shaped stop member 63, which may have some resiliency, that is disposed for engagement with an upper reach 64 of the frame 60.

The extension arms 47 are preferably cross connected into a unitary frame adjacent their opposite extremities by members 65 and 66, attached thereto in any suitable way, so as to afford adequate rigidity to said extension as a unit as well as assure movement of the extension arms 47 as a unit. Said cross connecting members 65 and 66 extend to the rear of the arms 47 so as not to interfere with the upward movement of the slide 19, 20 or the operation of other parts to be described.

Figure 5:
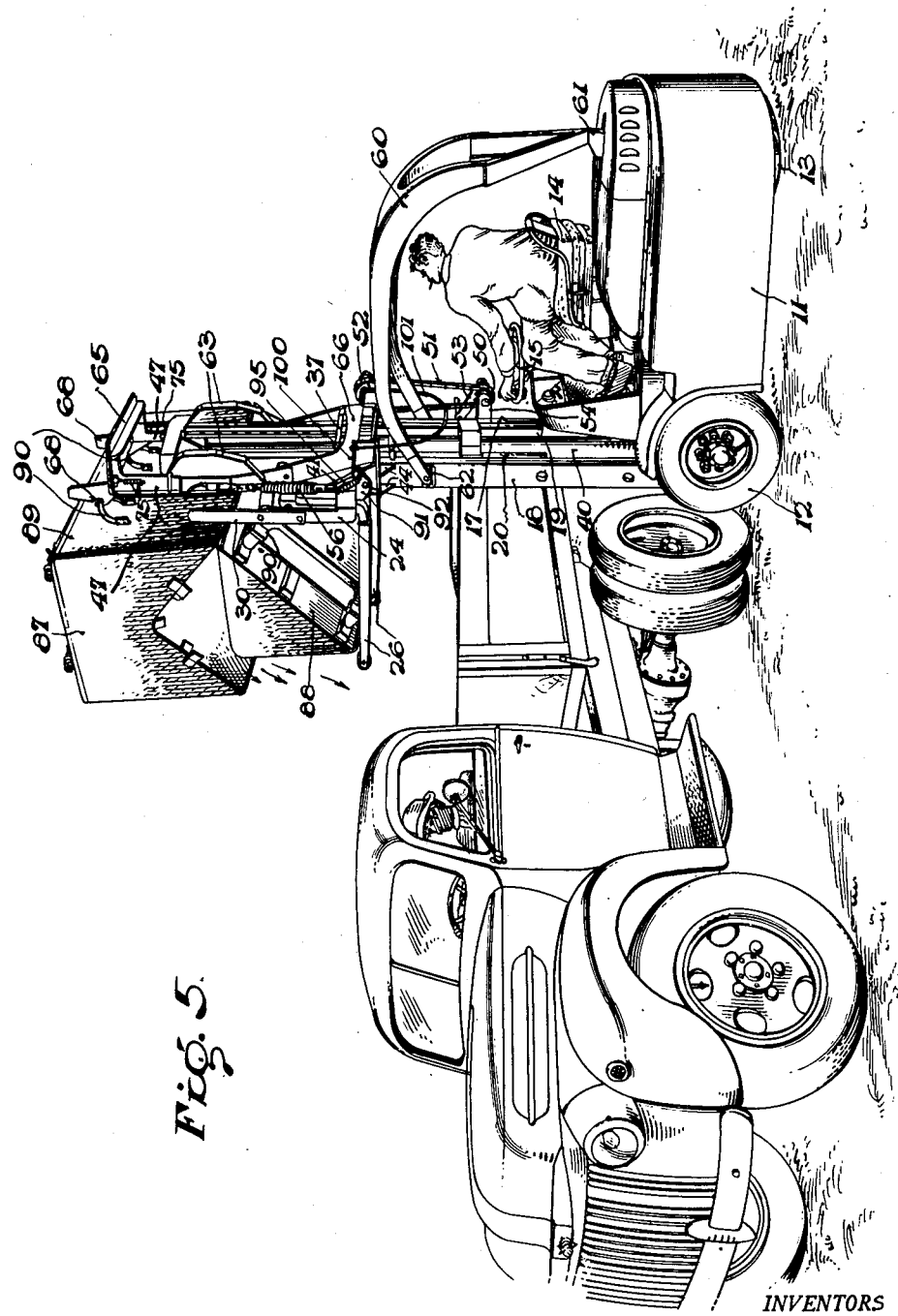
Fig. 5 is a perspective elevation to illustrate the use of the improved fork truck for filling a truck.

The aforesaid pivotally mounted extension, when in operative position, provides an extension above the ways proper into alignment with which the fork carriage may be elevated and by which a dumping container may be supported when it is desired to effect dumping at a relatively high elevation, such as may be required for emptying into a truck body as shown in Fig. 5. In order that such high level dumping may be effected, each of the arms 47 is preferably provided adjacent its upper extremity with an automatic hook.

Referring to Fig. 9 wherein the preferred automatic hook is shown in enlarged detail, each arm 47 has pivotally mounted thereon at 67 an automatic hook comprising a body member 68 having a stop extension 69. Body member 68 is cut away at 70 so as to provide a dwell 71, in front of which is an upstanding nose 72, and it also has a rearwardly inclined cam surface 73 extending downwardly from said nose. Extending from the pivot 67 at opposite sides of the arm 47 are arms 74 to which are attached coil springs 75, the opposite ends of said springs being attached to said arms 74 and to spring carriers 76 adjustably mounted by means of nuts 77 on brackets 78 carried by the opposite faces of the arm 47. Springs 75 are under tension to move the hook 68, 69, around its pivot 67 in a clockwise direction, and to limit the extent to which the hook may be so moved by the springs 75 an abutment member 79, which may take the form of a U-shaped bracket secured to the arm 47 in any suitable way, is adapted to be engaged by the extension 69 of said hook when the hook is in operative position with the cam surface 73 projecting forwardly of the arm 47. Pivotally mounted on the body portion 68 of said hook, as by means of a bolt 80, is a latch member 81 which may move between stop members 82 and 83 provided on said body portion 68. In order that latch member 81 may move freely under the action of gravity bolt 80 preferably passes freely through a sleeve 84 in said latch member as shown in Fig. 10. Stop member 82 is so disposed that when the latch member 81 is in its lower position as shown in full lines in Fig. 9, the edge 85 thereof closes the dwell 71 in the hook, and in this position said edge 85 projects well forwardly of nose 72 for a purpose to be explained. Stop member 83 is so disposed that even when the latch member 81 is moved to the dotted line position shown in Fig. 9, which occurs when the arms 47 are lowered to approximately horizontal position, the latch member will fall forwardly by gravity into engagement with stop member 82 and close the opening of the dwell 71 when the arms 47 are moved to upright position. Latch member 81 is also provided with a forward cam surface 86 for a purpose to be described.

Figure 2:
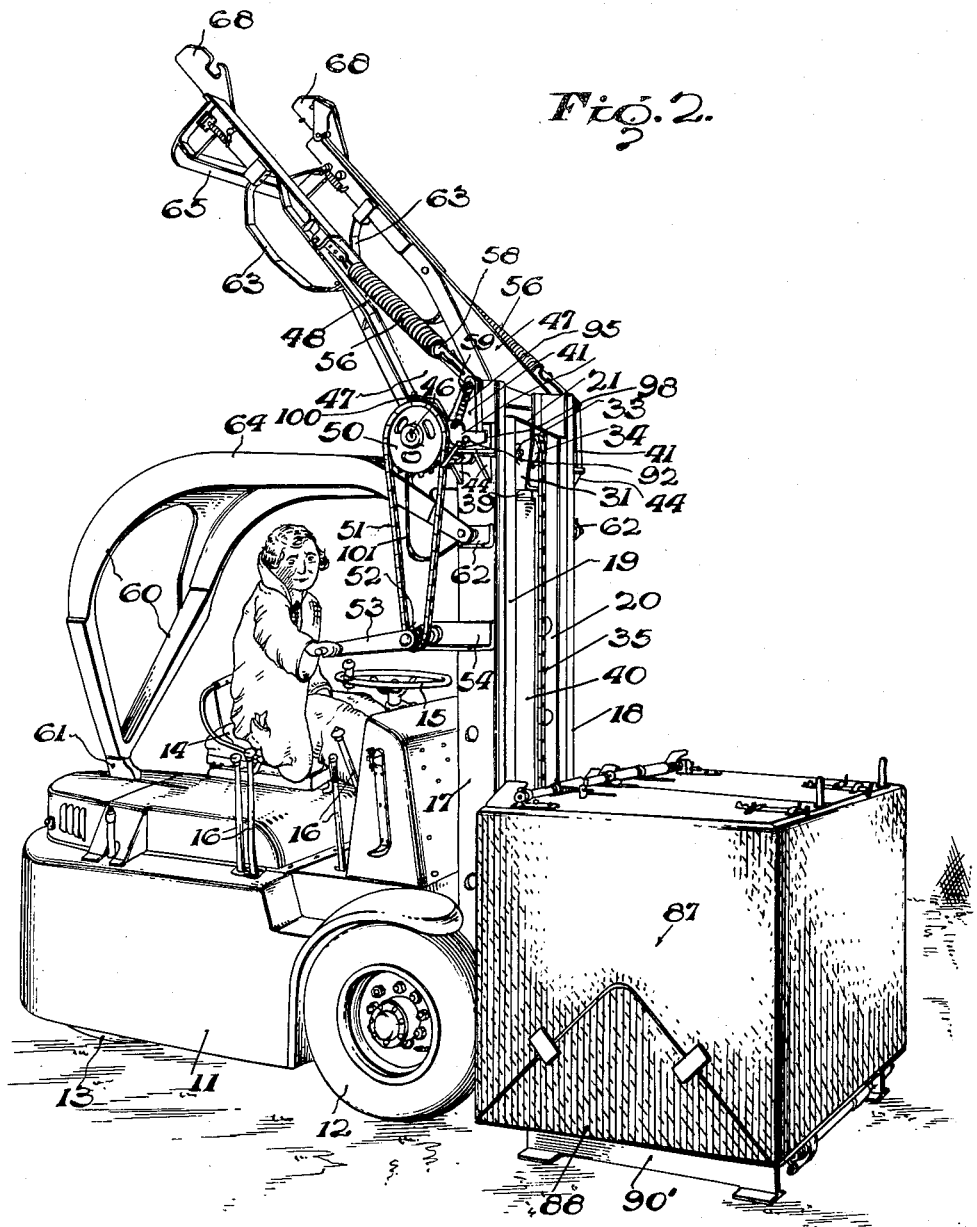
Fig. 2 is a corresponding view to illustrate the elevation of the extension toward its operative position.
Figure 3:
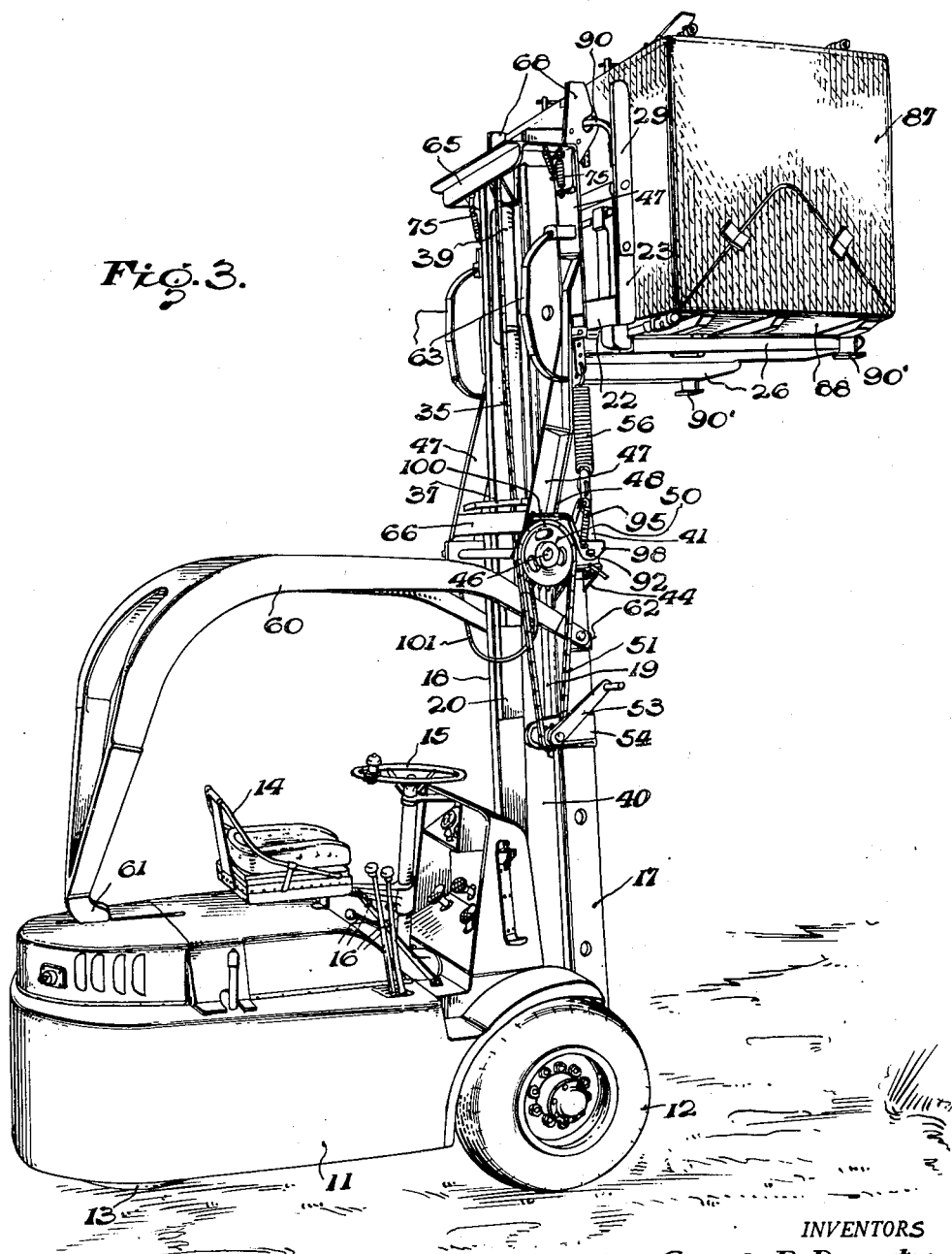
Fig. 3 is a perspective view to illustrate a dumping container engaged with automatic hooks when the extension is in its operative position.
Figure 4:
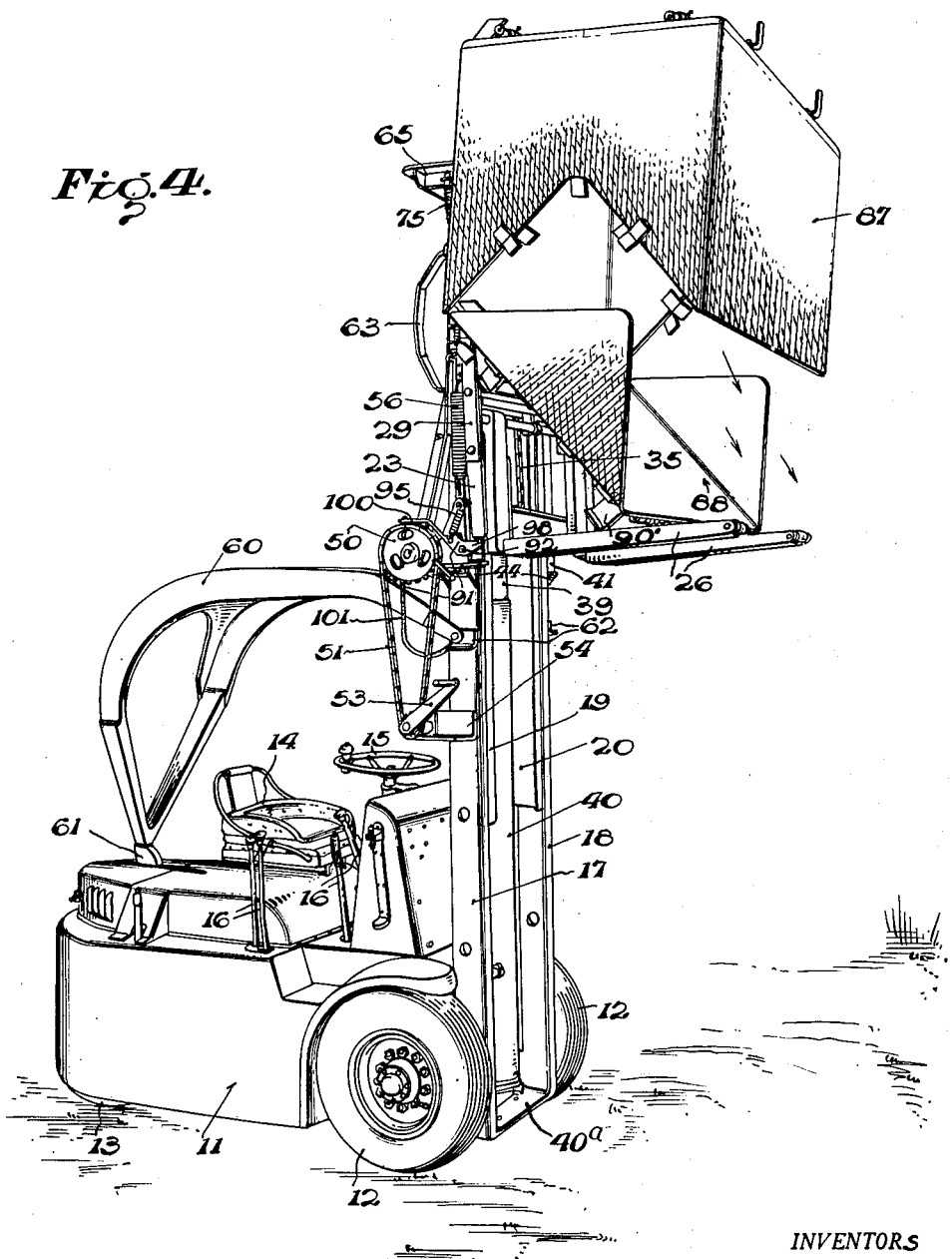
Fig. 4 is a perspective elevation to illustrate how the container of Fig. 3 may be dumped.

Any suitable dumping container may be used for high level dumping from the fork truck, that illustrated comprising a generally rectangular body 87 having a bottom 88 hinged to the lower rear edge of the container and provided on its rear wall 89 with a pair of bails 90 spaced apart by a distance equal to the spacing of the automatic hooks on the arms 47. Such a container may be lifted from the floor or ground by inserting the fork 26 under the container, as shown in Fig. 2, the container if not provided with legs or the like being mounted on suitable supports 90' so as to afford room for the fork 26 to be introduced under the bottom of the container.

When supported on the forks 26 the bottom of the container is held closed, and this relationship is maintained as the fork carriage with the container mounted thereon is lifted by the chain 35. As the container approaches its upper position (see Fig. 9) each bail 90 engages the upwardly inclined cam edge 73 of the body portion 68 of the hook member, moving the latter in an anticlockwise direction around its pivot pin 67 against the tension of the springs 75. When the bail 90 reaches the forwardly projecting portion of the edge 85 of latch member 81, it lifts the latter, pivoting the same around its pivot 80 until the bail 90 has passed the nose 72, whereupon the springs 75 move the hook member 68, 69 in a clockwise direction until the extension portion 69 engages the stop member 79. In this latter position the dwell 71 underlies the bail 90 so that, upon slight lowering of the fork carriage, the bail is engaged in the dwell 71, the latch member 81 following the bail downwardly to close the opening of the dwell and rest on the top of the bail.

If, now, the fork carriage is lowered by the chain 35, the container 87 remains suspended by the hooks, while the bottom 88 can follow the fork 26 downwardly as shown in Fig. 5 so as to effect dumping of the content of the container. The before referred to members 29 and 30 are designed to engage the rear wall 89 of the container, and when the fork 26 is lowered as just referred to after the container has been suspended on the hooks, said members 29 and 30 move downwardly along the rear wall 89 as shown in Fig. 5. In order to prevent the fork carriage from moving down so far that the members 29 and 30 would pass below the lower extremity of the rear wall 89 and thereby permit the container to swing against the pivotally mounted extension, in which position the container would prevent upward movement of the members 29 and 30 with the fork carriage upon which they are mounted, an automatic stop is preferably provided so as to limit the downward movement of the fork carriage as just described.

To this end (see particularly Fig. 8) a latch member 91 is pivotally mounted at 92 on each plate 41 at each side of the ways, and is normally held against a stop lug 94 by a coil spring 95 attached to a lug 96 on the member 91 and a lug 97 on the outer face of the plate 41. Latch member 91 has a nose 98 which is in the path of a side member 23 or 24 when the fork carriage is moved downwardly by the chain 35, so as to stop said fork carriage before the members 29 and 30 reach the lower edge of the container. Latch member 91 also has a cam surface 99 which will be engaged by the upper edge of the member 29 as the fork carriage moves upwardly, so that the latch member 91 will be cammed around its pivot 92 against the tension of the spring 95 and not interfere with the upward movement of the fork carriage. As soon as the fork carriage has passed said latch member 91, spring 95 draws each member 91 against the stop 94 and disposes the nose 98 in a position to engage the lower end of side member 23 or 24 and prevent excessive downward movement of the fork carriage. Latch member 91 has attached thereto in any suitable way an arm 100 and a cord 101 is connected to the two arms 100 in a position readily accessible to the operator of the truck. When the fork carriage is to be moved downwardly to restore the container to the floor or ground, the cord 101 is pulled to move the nose 98 of each latch member 91 out of the path of the fork carriage until the latter has moved below the same.

To disengage the container from the hooks, the fork carriage is moved upwardly by the chain 35 until the bottom of the container is closed, whereupon the container is moved upwardly and the bails 90 lift the latch plates 81 around their pivots 80. Continued lifting of the fork carriage moves the bails upwardly to a position such that they pass by the latch plates 81 which are then restored to the full line position shown in Fig. 9 by gravity. If now the fork carriage is moved downwardly the bails 90 engage the cam surfaces 86 on the latch plates 81, again moving the hooks 68, 69 around their pivots 67 in an anticlockwise direction until the bails are below the edges 85 of the latch plates 81, whereupon the hooks are returned by the springs 75 to engagement with the stop member 79 and they are in position for the next automatic operation of the hooks.

The operation of the fork truck is believed to be clear from the foregoing description. To summarize briefly, the truck 11 may be manipulated so as to insert the fork 26 under any suitable load or container. By admitting hydraulic fluid to the hydraulic device 40 the piston rod 39 may be moved upwardly, carrying therewith the pinion 34 which, by cooperation with the chain 35, lifts the fork carriage, the latter sliding on the forward faces of the ways 17 and 18. If the load does not have to be lifted above the ways 17 and 18 truck 11 may be used to transport the load on the fork 26 to the desired position, and then the load may be deposited on the floor or ground by the lowering of the fork carriage.

If the load is to be dumped from a high level, as when filling a truck, the crank 53 is rotated to move the extension arms 47 around their pivot 46 until said arms are moved into upright position. Thereby the arms 47 provide an upwardly reaching extension into alignment with which the fork carriage may be elevated through operation of the hydraulic device 40 and the chain 35. In lifting the arms 47 to their upright position the counterbalancing springs 56 assist in the elevation of said arms so that little force is required at the crank 53 to effect the elevating movement of extension arms 47.

In high level dumping of a bottom dump container on the fork 26 the fork carriage may be manipulated as just explained to engage the bails 90 with the automatic hooks 68, 69, following which the fork carriage may be lowered to effect dumping and then elevated again to pick up the container, after which it can be restored to the floor or ground. During the dumping operation the latch 91 assures that the fork carriage will not move downwardly so far as to cause the container to interfere with the subsequent raising of the fork carriage.

If the fork truck is to be moved through an opening which is lower than the height of the elevated position of the arms 47, said arms 47 may be moved easily and quickly to the desired extent or to the approximately horizontal position shown in Fig. 1, in which latter position the arms 47 are carried by the frame 60 with the weight thereof at least in part sustained by the tension of the springs 56.

It will therefore be perceived that the present invention provides a fork truck with a pivotal extension mounted on the upwardly extending ways which may be moved into and out of operative position without requiring operation of the carriage on which the fork is mounted. By reason of the counterbalancing provision the pivotally mounted extension may be moved into operative position with a comparatively small effort and at relatively high speed. Once in operative position said extension with its automatic dumping hooks provides for automatic dumping at the desired high level so that the fork truck may be readily used for filling bins, truck bodies and other containers requiring elevation of the fork well above the limit of the conventional ways provided on such fork trucks. When used for automatic dumping the mechanism includes means whereby the fork carriage cannot be accidentally moved to such a position as to prevent subsequent picking up of the container by elevation of the carriage. The means providing the pivotally mounted extension is simple in construction and composed of parts which are easy and inexpensive to fabricate and assemble. Thereby a readily manipulatable provision for high level dumping from a fork truck has been provided which is strong and durable, easy to manipulate and highly efficient in operation.

While the embodiment of the invention illustrated on the drawings have been described with considerable particularity, it is to be expressly understood that the invention is not limited thereto, as the same is capable of receiving a variety of mechanical expressions, as will now be apparent to those skilled in the art, while changes may be made in the details of construction, arrangement, size and proportion of parts, parts may be replaced by equivalent parts, certain features may be used without other features, etc., without departing from the spirit of this invention. Reference is therefore to be had to the appended claims for a definition of said invention.

What is claimed is:

1. In a fork truck of the type comprising a truck body, upright ways mounted on said body and a fork for movement up and down said ways, in combination with said ways, extension arms pivotally mounted on said ways, means for moving said extension arms into and out of a position in which said extension arms constitute extensions of said ways, a slide mounted on said ways, means mounted on said body for moving said slide, a carriage supporting said fork and slidable on said ways into cooperative relationship with said extension arms when in operative position, automatic hooks carried by said extension arms adjacent the outer extremities thereof for cooperation with a load on said fork, and means on said ways for cooperation with said carriage to prevent excessive downward movement of said carriage while a load is suspended on said hooks, said means including a latch member pivoted on a way, resilient means for moving said latch member into the path of downward movement of said carriage, and means for releasing said latch member.

2. In a fork truck of the type comprising a truck body, upright ways mounted on said body and a fork for movement up and down said ways, in combination with said ways, extension arms pivotally mounted on said ways, means for moving said extension arms into and out of a position in which said extension arms constitute extensions of said ways, a slide mounted on said ways, means mounted on said body for moving said slide, a carriage supporting said fork and slidable on said ways into cooperative relationship with said extension arms when in operative position, and an automatic hook on each extension arm including a body member provided with a dwell and a cam edge, means for pivotally mounting said body member on an arm, resilient means cooperating with said body member to urge said cam edge into the path of a load carried by said fork, and stop means for predetermining the operative position of said body member.

3. In a fork truck of the type comprising a truck body, upright ways mounted on said body and a fork for movement up and down said ways, in combination with said ways, extension arms pivotally mounted on said ways, means for moving said extension arms into and out of a position in which said extension arms constitute extensions of said ways, a slide mounted on said ways, means mounted on said body for moving said slide, a carriage supporting said fork and slidable on said ways into cooperative relationship with said extension arms when in operative position, and an automatic hook on each extension arm including a body member provided with a dwell and a cam edge, means for pivotally mounting said body member on an arm, resilient means cooperating with said body member to urge said cam edge into the path of a load carried by said fork, stop means for predetermining the operative position of said body member, a latch member pivotally mounted on said body member for movement by gravity into a position cooperating with said dwell, and stop means on said body member for preventing excessive movement of said latch member when the extension arm is moved out of its operative position.

4. In a fork truck of the type comprising a truck body, a load carrying fork, and fork elevating mechanism including upright ways mounted on said body and means for moving said fork along said ways, and to an elevated position above said ways, the combination with said elevating mechanism of a frame pivotally mounted on said truck adjacent the top of said ways, means carried by said frame for engaging and suspending a load elevated by said fork, and means for swinging said frame about its pivot to an upright position in which said engaging and suspending means is aligned with a load on said fork when said fork occupies said elevated position.

5. The combination defined in claim 4, including means on said truck for supporting said frame in an approximately horizontal position, said frame swinging means moving said frame between said horizontal and upright positions thereof.

6. The combination defined in claim 5, said frame swinging means comprising manually operable cooperating gear elements mounted respectively on the pivot of said frame and on said ways.

7. The combination defined in claim 6, including counterbalancing means for counterbalancing at least a part of the weight of said frame when lowered from its upright position.

8. The combination defined in claim 7, said counterbalancing means comprising a spring extending between said frame and said ways in a position to be tensioned by lowering of said frame.

9. In a fork truck of the type comprising a truck body, a load carrying fork, and fork elevating mechanism including upright ways mounted on said body, a slide movable up and down said ways, and means operatively connecting said slide and fork for moving said fork to an elevated position above said ways, the combination with said elevating mechanism of a frame pivotally mounted on said ways adjacent the top thereof, means carried by said frame for engaging and suspending a load elevated by said fork, and means on said body for moving said pivoted frame to an upright position in which said engaging and suspending means is in position to be engaged by a load on said fork when said fork moves to said elevated position.

10. The combination defined in claim 9, the operative connection between said slide and fork comprising a pinion movable with said slide and a chain meshing with said pinion and having one end fixed and the other end connected to said fork, whereby upward movement of said slide causes said fork to move upwardly with and also relatively to said slide.

11. In a fork truck of the type comprising a truck body, a load carrying fork, and fork elevating mechanism including upright ways mounted on said body and means for moving said fork along said ways and to an elevated position above said ways, the combination with said elevating mechanism of container dumping means comprising a frame pivoted to said ways on an axis adjacent the top of said ways, an automatic hook carried by said frame near its outer end, and means for swinging said frame about its pivot to an upright position wherein a container on said fork engages and is suspended by said hook for dumping when said fork is moved to said elevated position.

12. In a fork truck of the type comprising a truck body, a load carying fork, and fork elevating mechanism including upright ways mounted on said body, a slide movable up and down between said ways, and operative connections between said slide and fork for moving said fork to an elevated position between said ways, the combination with said elevating mechanism of a pair of arms pivoted to the upper ends of said ways on a common axis, means conecting said arms to swing as a unit, means for swinging said arms to an upright position above said ways, said arms being laterally spaced whereby said slide can move freely upward between them, and automatic dumping hooks one carried by each arm near its outer end to engage and suspend a container on said fork when said arms are in their upright position and said fork is moved to said elevated position.

13. The combination defined in claim 12, each of said hooks comprising a body member pivotally mounted on the associated arm and including a cam edge, resilient means between said body member and arm for urging said cam edge forwardly of said arm, and stop means for locating said cam edge in a position for engagement by the container on said fork.

14. The combination defined in claim 13, each of said hooks including a latch member pivotally mounted on said body member for cooperation with the hook opening, and stop means on said body member cooperating with said latch member to prevent movement of said latch member when said arm is out of upright position beyond the point where said latch member will return by gravity to its operative position when said arm is moved to upright position.

15. In a fork truck of the type comprising a truck body, a container-elevating fork having horizontal and vertical members for supporting a box-like container, and fork elevating mechanism including upright ways mounted on said body and means for moving said fork along said ways and to an elevated position above said ways, the combination with said elevating mechanism of container dumping mechanism comprising a frame pivoted to said ways adjacent their upper ends, an automatic hook carried by said frame near its outer end, means for swinging said frame about its pivot to an upright position wherein a container on said fork engages and is suspended by said hook for dumping when said fork is moved to said elevated position, and means on said ways in position to be engaged by said fork on its downward movement from said elevated position to prevent descent of the vertical members of said fork beneath said suspended container.

GEORGE R. DEMPSTER.
HARRY W. JONES.

References Cited in the file of this patent

UNITED STATES PATENTS

| Number | Name | Date |
|---|---|---|
| 2,121,121 | Dempster | June 21, 1938 |
| 2,164,739 | Gerosa et al. | July 4, 1939 |
| 2,273,359 | Johnson | Feb. 17, 1942 |
| 2,325,568 | Eaton | July 27, 1943 |
| 2,391,412 | Gorton | Dec. 25, 1945 |
| 2,445,038 | Riemenschneider et al. | July 13, 1948 |
| 2,484,512 | Ingram | Oct. 11, 1949 |
| 2,494,651 | Flynn | Jan. 17, 1950 |
| 2,502,357 | Wagner | Mar. 28, 1950 |
| 2,503,181 | Wagner | Apr. 4, 1950 |
| 2,506,242 | Shoemaker | May 2, 1950 |
| 2,542,425 | Oliver | Feb. 20, 1951 |

FOREIGN PATENTS

| Number | Country | Date |
|---|---|---|
| 327,795 | Great Britain | Apr. 17, 1930 |